United States Patent

Comeaux

(10) Patent No.: US 8,844,190 B2
(45) Date of Patent: Sep. 30, 2014

(54) FISHING LURE

(71) Applicant: Kenneth P. Comeaux, Millwood, KY (US)

(72) Inventor: Kenneth P. Comeaux, Millwood, KY (US)

( * ) Notice: Subject to any disclaimer, the term of this patent is extended or adjusted under 35 U.S.C. 154(b) by 82 days.

(21) Appl. No.: 13/694,709

(22) Filed: Dec. 26, 2012

(65) Prior Publication Data

US 2014/0173968 A1 Jun. 26, 2014

(51) Int. Cl.
*A01K 85/00* (2006.01)
*A01K 85/14* (2006.01)

(52) U.S. Cl.
CPC ...................................... *A01K 85/14* (2013.01)
USPC ................................ 43/42.03; 43/42; 43/42.5

(58) Field of Classification Search
USPC .................... 43/42.03, 42, 42.5, 42.37, 42.52
See application file for complete search history.

(56) References Cited

U.S. PATENT DOCUMENTS

| | | | | |
|---|---|---|---|---|
| 1,986,282 | A * | 1/1935 | Parker | 43/42.39 |
| 4,894,945 | A * | 1/1990 | Perrine | 43/42.5 |
| 5,133,146 | A * | 7/1992 | Stecher | 43/42.5 |
| 5,396,728 | A * | 3/1995 | Weber | 43/42.37 |
| 5,887,378 | A * | 3/1999 | Rhoten | 43/42.03 |
| 7,726,062 | B2 * | 6/2010 | Davis | 43/42.15 |
| 7,757,426 | B2 * | 7/2010 | Kemp | 43/43.15 |
| 2014/0033601 | A1 * | 2/2014 | Moran, Jr. | 43/42.39 |

* cited by examiner

*Primary Examiner* — Christopher P Ellis
(74) *Attorney, Agent, or Firm* — Carrithers Law Office PLLC

(57) ABSTRACT

A fishing lure generally including a weighted body portion surrounding the front half of the shank of a hook, a relatively flat spoon portion extending rearward from a lower surface of the body portion, an artificial worm holding barb on the rear end of the body and a feather holding rim just forward of the worm holding barb. The configuration of the body tends to keep the spoon below the hook as the bait is pulled through the water. The hooked portion and the point of the hook extend upward perpendicularly above the surface of the spoon. The weight distribution and general shape of the lure prevents spinning but encourages a more natural and fish attracting side to side motion of the lure while being pulled through the water.

7 Claims, 5 Drawing Sheets

FISHING LURE

TECHNICAL FIELD

The present invention relates to the field of fishing lures and more particularly to artificial lures which mimic live bait motion while moving through the water.

BACKGROUND OF THE INVENTION

There are typically three directions a fishing lure will move in when being retrieved or when trolled from a boat. These are sway (the side to side movement), pitch (the up and down movement) and wobble which is the rolling action of the lure. Lures, spinners, and spoons are the typical categories. The effectiveness of the lure is determined by weight, color, actions of the lure and the speed of retrieval by the angler.

Artificial lures often contain portions which resemble small fish, frogs, insects or worms. Such lures often include a spinning portion which reflects light in hopes that the flickering will also attract fish. The shape of such lures often leads to unnatural wobbling, spinning or jerking of the entire lure while moving through the water, which may tend to scare fish away.

Attempts at designs which encourage a more natural movement of the lure have included tail members which impart a wiggle as a lure moves through the water. Some designs which are exemplary of such attempts include a tail which extends outward from the body of the lure, a tail with a curved end defining a J-shape, or a tail which includes a forward canted wing piece which fluctuates as the bait is pulled forward and causes the bait to flutter. Other lures include a rigid, canted spoon or wall fixed near a front face of a lure and jutting forward out from the face causing the lure to zig zag violently while moving through the water. Some examples include a plurality of articulating body parts linked together by eyelets or chain links. Still other examples comprise a spoon shaped body which either spins or darts about while being pulled through the water.

A lure which closely mimics the movement of live bait in water is the desired but as of yet unattained goal of artificial lure designers.

Moreover, substantially all of the conventional types of spoon baits of either open or weedless types tend to turn over or spin when used with an extension member such as a tail, artificial lure such as a worm, skirt of the like.

DESCRIPTION OF THE RELATED ART

U.S. Pat. No. 2,738,612 by French teaches a casting spoon having a hook attached thereto for fastening a pork frog or pork strip for use in casting for fish. The spoon is designed open at the rear of the spoon adjacent the rearward extending shank of the hook for attachment of the pork.

U.S. Pat. No. 2,586,186 by Swanberg teaches a spoon type bait wherein the unique hook is formed with an integral eel-like portion.

SUMMARY OF THE INVENTION

The present fishing lure is preferably made entirely of metal, but is also adapted to be constructed of other selected materials in whole or part such as plastic or fiber glass if desired. Except for the hook it is possible to mold the entire lure as an integral unit. The present invention is directed toward a spoon lure wherein the spoon is spaced apart from the hook portion of the lure by a neck protruding or extending upward from a substantially flat parabolic shaped weighed base or foot having a slightly curved bottom wherein the base connects to the front end of a spoon having a front end wedged within a slot or lateral groove formed in the end of the base. The neck supports a teardrop, wedge, or football shaped head formed integrally with the neck and base. A stem formed integrally with the head, neck and base, extends rearward from the head and includes a ring or rim spaced apart a selected distance from the head for attachment of the elastic collar of a skirt or other bait and surrounding the shaft of a barbed hook protruding from the distal end thereof extending upwardly over the spoon body. The shank of the hook is positioned centrally and longitudinally on top of the spoon body so that the bite portion of the hook projects upwardly at a right angle to the spoon body over the inner end of the tail piece. The hook is disposed at a selected angle from the surface of the spoon. The spoon body is constructed of a single shiny piece of metal of suitable gauge forming a dove tail shaped tail piece. The spoon body is of a concave-convex construction and substantially oval in shape terminating at one end in a tapering tail and with the head portion of the spoon interlocking with the groove within the base in a tongue and groove arrangement with the base formed in a complimentary concave-convex shape in accordance with the front end of the spoon. The weight of the head and the base with respect to the surface area of the spoon is important in order to provide the weight and balance necessary for control of the movement of the spoon to prevent twisting or spinning in the water. An eyelet extending from the front top end of the head serves to connect the line to the lure.

More particularly, there is provided a fishing lure comprising, consisting of, or consisting essentially of a head supported by a neck extending from a parabolic shaped weighted base to which a spoon or blade is affixed at a selected angle. A stem extends from the head and includes a collar and shaft when which a hook extends spaced apart a selected distance centered above the spoon body. The spoon body is affixed by disposing or wedging the front end portion into a lateral groove formed in the rear end of the base. An eye extends forward from the top portion of the head. The head portion is generally wedged shaped and extends upwardly from a wedge shaped neck. The stem extending from the rear of the head surrounds a portion of the hook shank and includes an optional collar spaced a selected distance from the rear of the head for attachment of a skirt, feathers or other members extending from the lure body extending from the head. The collar is located a selected distance rearward of the head portion and extends radially outward from the stem. The stem also includes a barbed portion at a rear end thereof. The barbed portion is located a selected distance rearward of the collar. The head portion is generally wedged shaped; however, it is contemplated the head can be conical, football shaped, or teardrop shaped as well. The shank extends from and centered with respect to the rear surface of the head. One or two keepers comprising a projection formed on the shaft and/or one or two short wires having a curved distal end may extend a short distance from the rear of the head on either side of the shaft for retaining tube bait and the like.

The spoon of the lure extending rearward from the fan shaped base is held by and extends rearward therefrom. The elongated narrow spoon has a bottom surface, a top surface, a teardrop shaped peripheral edge tapering into a pointed rear end.

The spoon portion comprises a standard "willow" blade having a thickness of about one sixty-fourth of an inch and has a width of about one third of the length of the spoon. The spoon is slightly cupped upward near the marginal edges thereof and the bottom surface is curved from the from front to the rear and side to side from about 30 to 45 degrees. The bowl of the spoon is about one sixty-fourth inch deep. The top surface of the spoon faces the shank and is approximately parallel to the shank. The top surface of the spoon is spaced apart from the shank. The free end of the spoon extends rearward beyond the bend of the hook.

The design of the instant invention provides a means for the novel weight distribution to permit numerous casting techniques to be employed with the lure. For instance, one popular method of spin casting the spoon lure of the present invention is known as "Walking the Dog" comprising a left to right motion. The objective is to make sure that there's some "line-slack" immediately before each jerk, and immediately after each jerk providing a crisp, natural motion to the lure, unfettered by drag. More particularly, the rod is held low with the rod tip about 1 to 1.5 feet above the water after splashdown. The motion of the lure is activated with wrist action or by using a whole arm motion that pivots from the shoulder. Because of the slack in the line, the rod-tip must move considerably farther than the lure. The pulls are short, typical about 6 inches "at the lure". At the end of each down-stroke the rod-tip nearly touches the water and is immediately returned to its original position. The opposing hand can be used to take up slack line as it becomes available. Thus, the delivery is a non-stop series of rhythmic strokes that jerk the lure by snapping slack line. The motion causes the lure to zigzag about several inches to alternating sides without pause. The rod-tip must move further than the lure to overcome the line-slack. The lure appears to never stops moving. The lure moves back-and-forth with minimal forward motion.

The lure of the instant invention can also be jerked or popped with the rod so that the bait will actually turn over in a loop the loop. The bait can even be rolled over in a controlled manner.

An especially novel feature is the ability to control the movement of the lure when it is sinking so that it wobbles side to side and/or around its center of gravity without the application of any forward motion from the rod and reel. The spoon or blade can be pivoted upon the center of gravity from side to side and rotate up to 180 degrees with respect to the line while still maintaining control of the lure. The lure is designed with the weighted base, neck and head to maintain the center of gravity under the head and base.

It is an object of this invention to provide a fishing lure which mimics the movements and motion of live bait as the lure is pulled through the water.

It is an object of this invention to provide a fishing lure which is weighted and balanced in such a way as to maintain a smooth lifelike movement through the water.

It is another object of the present invention to provide a fishing lure having a design that is shiny and attracts fish while providing unique movement and action as the fishing lure is pulled through the water.

It is another object of the present invention to provide a spoon bait which creates a transverse swinging or oscillating movement about the hook point.

It is another object of the present invention to utilize a weighted head in combination with a spoon anchored at and wedged into a groove formed in the rear edge of a front end of a weighted parabolic shaped plate to control oscillating movement of the spoon and prevent the spoon from turning over or spinning when the spoon bait is used with or without an extension member such as a tail, worm, skirt or other trailing bait member.

It is another object of the present invention to provide a fish lure having a spoon body and having a hook member supported thereon.

It is another object of the present invention for the head, neck, base, and stem is integrally formed of a single piece.

It is another object of the present invention to form the head, neck, base and stem from lead in a selected size and shape and weight with respect to the selected size of the spoon to control the balance of the lure.

It is another object of the present invention to provide a lure having a spoon body wherein the hook point and barb remains serves as the center about which a lure oscillates when the spoon lure is pulled through the water.

It is another object of the present invention to provide a lure which will continue movement even when the angler stops reeling in the lure wherein the lure will exhibit movement as it sinks continuing to have life like movement until the lure hits the bottom or the lure is maneuvered with the rod and reel.

It is an object of this invention to provide a fishing lure which includes a body shaped like the head of a fish, a frog, an insect, or other streamlined shape and a rearward facing spoon portion.

It is an object of this invention to provide a fishing lure containing at least one hook and a body which includes structural elements such as a barbed element and/or an outward extending rim which provide a means to attach an artificial worm and/or a feather for attracting fish.

It is an object of this invention to provide a fishing lure containing at least one hook, a body and a shallow spoon portion which is balanced and weighted so that the lure is oriented with the spoon portion at the bottom as the lure is pulled through the water.

It is another object of the present invention to provide a means for attachment of a hook guard to help prevent entanglement in moss and weeds.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
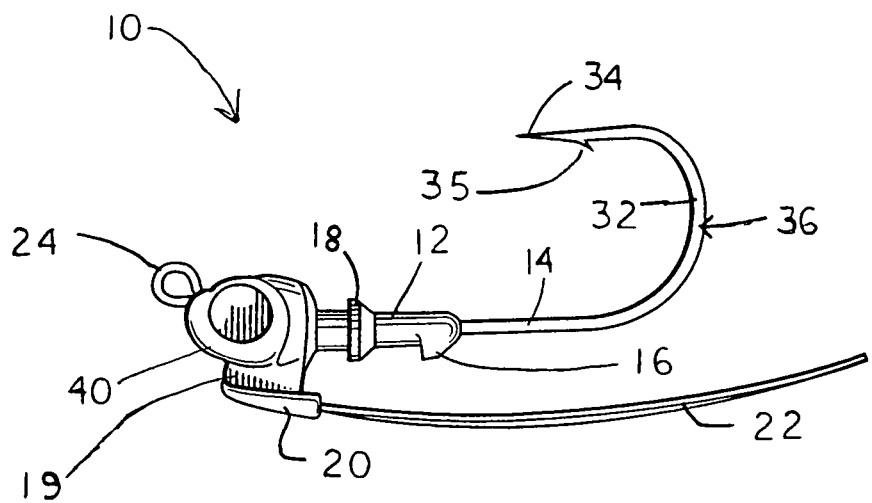
FIG. 1 is a left side view of the fishing lure.
Figure 2:
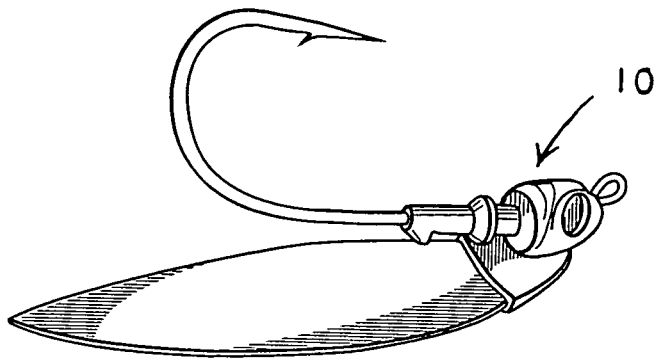
FIG. 2 is a right side view of the fishing lure.
Figure 3:
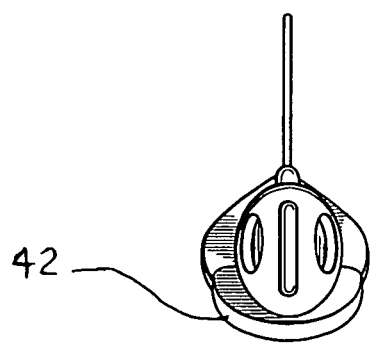
FIG. 3 is a front view of the fishing lure.

The present fishing lure is preferably made entirely of metal particularly steel or aluminum or copper or chrome or stainless steel usually in combination with lead, but is also adapted to be constructed of other selected materials in whole or part such as plastic or fiberglass if properly weighted to maintain the desired balance. The present invention is directed toward a spoon lure wherein the spoon is spaced apart from the hook portion of the lure by a neck protruding or extending upward from a substantially flat slightly curved parabolic shaped weighed base or foot connecting to the front end of a spoon having a front end wedged within a slot or lateral groove formed in the end of the base. The neck supports a tear drop, wedge, or football conical shaped head formed integrally with the neck and base. A stem formed integrally with the head, neck and base, extends rearward from the head and includes a collar for attachment of skirt or other bait and surrounds the shaft of a barbed hook protruding from the distal end thereof extending upwardly over the spoon body. The shank of the hook is positioned centrally and longitudinally on top of the spoon body so that the bite portion of the hook projects upwardly at a right angle to the spoon body over the inner end of the tail piece. The hook is disposed at a selected angle from the surface of the spoon. The spoon body is constructed of a single shiny piece of metal of suitable gauge forming a dove tail shaped tail piece. The spoon body is of a concave-convex construction and substantially oval in shape terminating at one end in a tapering tail and with the head portion of the spoon interlocking with the groove within the base in a tongue and groove arrangement with the base formed in a complimentary concave-convex shape in accordance with the front end of the spoon. The weight of the head with respect to the surface area of the spoon is a critical relationship in order to provide the weight and balance necessary for control of the movement of the spoon. An eyelet extending from the front top end of the head serves to connect the line to the lure.

As best shown in FIGS. 1-13, a spoon type fishing lure 10 comprises, consists of, or consists essentially of a head 40 mounted around the top front end portion of a hook 36 having a body 12 extending from the head and surrounding a selected portion of the shank 14 of the hook. The head is an aerodynamic shape comprising a teardrop, wedge, cone, or football shaped head formed integrally with a neck and base. The head may be of a fanciful design such as that of a fish, insect or amphian as well. The neck supports a teardrop, wedge, or football shaped head formed integrally with the neck and base. The head is attached to the spoon 22 by a wedge shaped neck 19 protrudes or extends upward from a substantially flat parabolic shaped weighed base 20 or foot having a rounded front end 42 and a slightly curved or convex bottom 44 wherein the base 20 connects to the front end 46 of a spoon 22 having a front end 46 wedged within a slot or lateral groove 48 formed in the rear end wall 50 of the base. The stem body 12 is formed integrally with the head, neck and base, and extends rearwardly from the head and includes a ring or rim 18 spaced apart a selected distance from the head 40 for the optional attachment of the elastic collar 26 of a skirt or feathered attachment 27 or other bait or attachment member which surrounds the shaft 14 of a barbed hook protruding from the distal end thereof extending and curving upwardly over the spoon body. The hook 36 comprises a point and barb 35, a bend 32, a shank 14 and an eye 24 which extends from the front top portion of the head. The shank is the straight portion of the hook between the eye 24 and the bend 32. The neck and base spaces the spoon body below the shank of the hook which is positioned centrally and longitudinally on top of the spoon body so that the pointed tip portion of the hook projects upwardly at a right angle to the spoon body.

Figure 5:
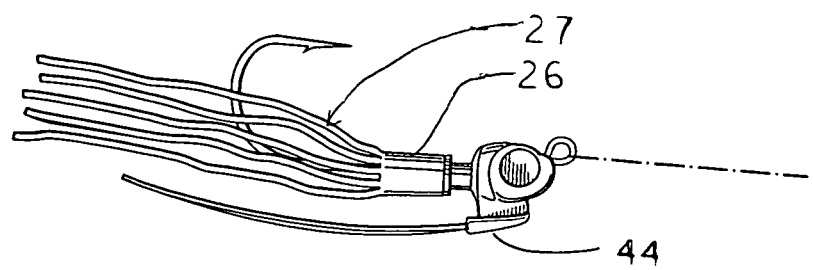
FIG. 5 is a right side view of the fishing lure with a feather attachment.
Figure 6:
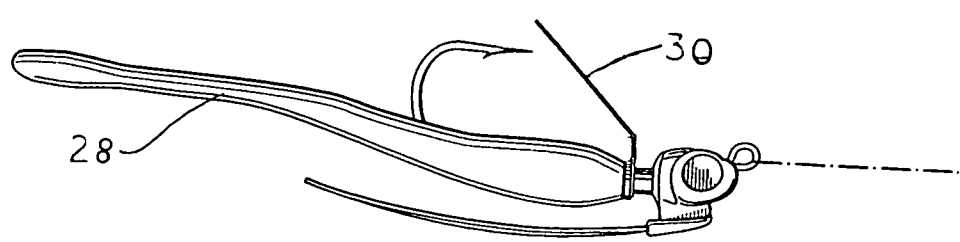
FIG. 6 is a right side view of the fishing lure with a night crawler attachment.
Figure 7:
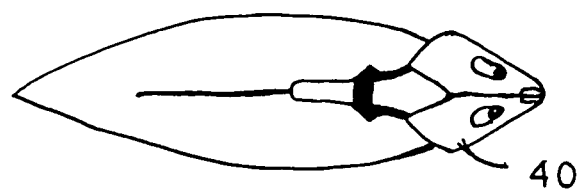
FIG. 7 is a top plan view of an alternate embodiment of the present invention showing a wedge shaped head spoon lure.
Figure 8:
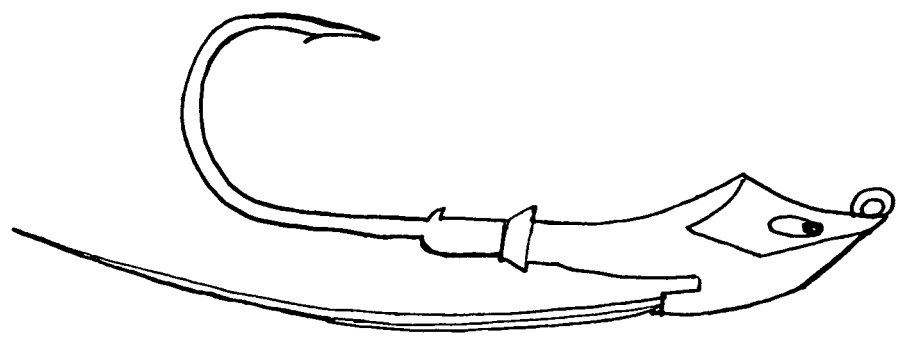
FIG. 8 is side view of the wedge shaped head spoon lure.
Figure 9:
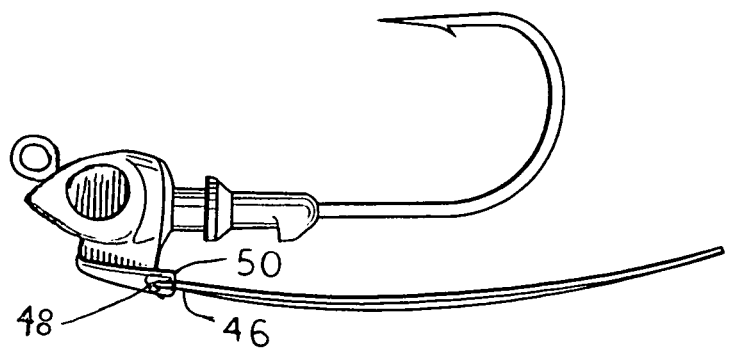
FIG. 9 is a top view of a cone shaped head spoon lure showing a cutaway view of the front end of the spoon disposed in the wedge shaped cavity formed in the rear end wall of the parabolic shaped base.
Figure 10:
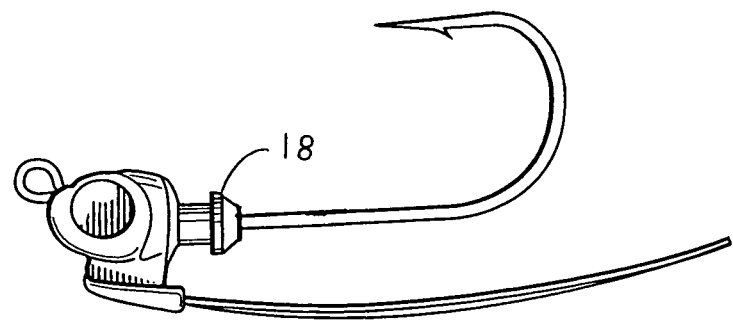
FIG. 10 is a side view of the present embodiment shown without the barb retaining member or wire guard.
Figure 11:
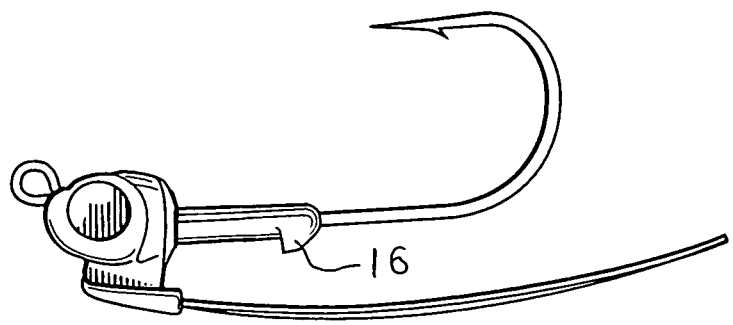
FIG. 11 shows an embodiment of the present invention without the retaining rim coaxially encircling the stem.
Figure 12:
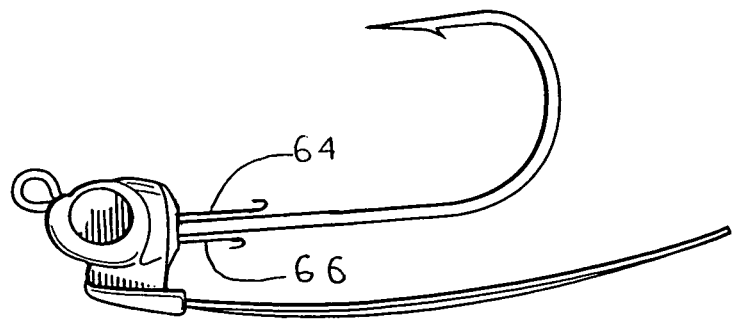
FIG. 12 shows an embodiment using a pair of wire keepers in place of the rim and or barb retaining member on the stem.
Figure 13:
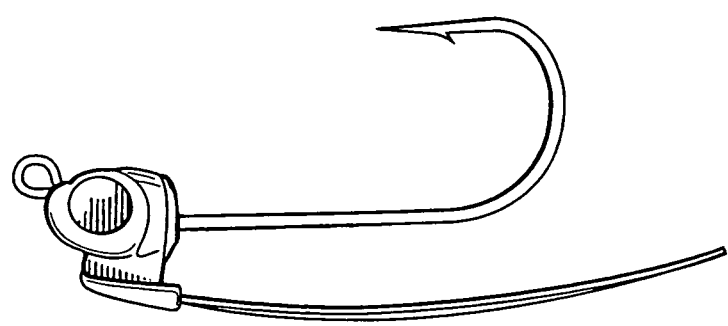
FIG. 13 shows an embodiment without the stem body, rim, or barb retaining member.

The body portion 12 is located at the front of the lure and resembles the head of a fish, frog, or insect. The body 12 includes a rear, cylindrical stem 12 coaxially surrounding the shank 14. The ring or rim 18 which extends radially outward from the neck 19. In one embodiment, a barbed element 16 projects outwardly from the stem. As shown in FIG. 5, the rim 18 provides a ledge over which the elastomeric collar 26 of a feather attachment 27 is slipped. In this position, the elastomeric collar 26 tightly embraces the rim portion 18. In FIG. 6, an attachment member such as an artificial elastomeric night crawler 28 is partially impaled over the point and barb 35, the bend 32, the shank 14 and is then impaled upon barb 16. The remainder of the artificial night crawler 28 dangles behind the hook. The barb 16 is firmly grasped by the neck portion 29 of the night crawler 28. FIG. 12 shows an alternate embodiment wherein keepers 64, 66 comprise curved wire members extending rearwardly from the back of the head on either side of the shaft of the hook.

Figure 4:
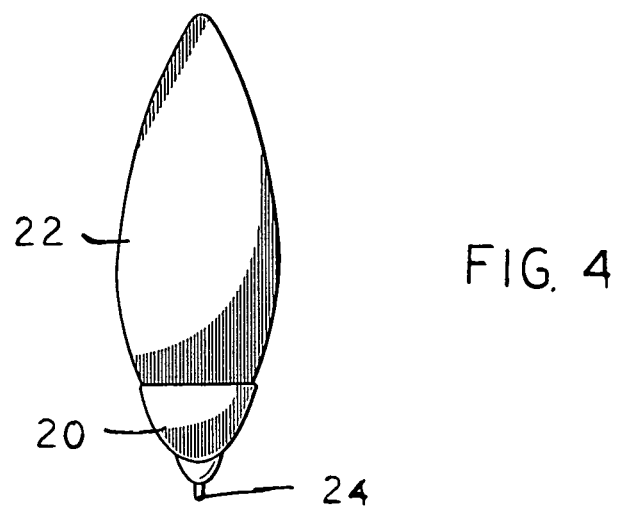
FIG. 4 is a bottom view of the fishing lure.

A neck portion 19 extends downward from the body portion 12 and flares out in a rearward direction to form a horizontal spoon holding fan portion 20. The shallow spoon 22 extending rearward from the fan or base portion 20. A shallow spoon member 22 is held in and extends horizontally rearward from the fan portion 20. In one preferred embodiment, the spoon portion 22 is approximately one and one half of the length of the shank 14 and therefore extends rearward past the hook 36. As shown in FIG. 4, the flattened side of spoon 22 has the overall outline of an elongated willow leaf with the widest portion being approximately one third of the overall length of the spoon. The thickness of the spoon is approximately one sixty-fourth of an inch. With reference to FIG. 1, the spoon 22 is slightly cupped upward near the marginal edges so that the bowl of the spoon is about 1/64 inch deep.

The body 12 is preferably made from lead, a lead alloy or any similarly dense, corrosion resistant material which can be molded. The body is preferably molded to resemble the head of a fish, frog, or insect. The spoon is preferably made of stainless steel, aluminum, steel, chromed steel or other shiny metallic material.

Other preferred embodiments include a hook whose shank is between approximately one third and two thirds of the overall length of the spoon 22.

As shown in FIG. 6, one preferred embodiment of the fishing lure includes a fine, leaf spring like flexible wire guard 30 or double wire guard comprising a plastic or preferably metal extending from the stem 12 of the lure to the point 34 and barb 35 of the hook which tends to prevent weeds and moss from gathering on the hook. However the guard 30 is weak enough to allow a fish to swallow and bite the bait and become hooked on the lure. Attachment of extension members such as a living or artificial lure, for instance a rubber worm or skirt to or over and around the hook.

While movement of the fishing lure is shown and described as being in a side to side manner, it is also understood that movement of the lure may be in an up-and-down manner. When a technique such as "walk the dog" is employed the weighted head together with manipulation of the rod imparts a strong up-and-down or side-to-side movements resulting in sliding or twisting of the lure body about is longitudinal axis. The twisting of the body imparts a wavelike motion to any extension members such as feathers, tails, worms or other trailing bait attached to the hook shank behind the lure body in front of or on the hook. The vigorous motion of the body or body with extension members functions to attract fish as the fishing lure is pulled or moves through the water.

Moreover, the lure body's spoon behaves like a sled providing sliding moves in a side-to-side motion that is attractive to fish.

While the body extension member of the present invention has been shown and described in connection with two specific lure configurations, it is understood that the body extension member may be used in connection with artificial fishing lures of virtually any configuration. In addition, it is understood that the end structure of the body extension member may be located at the end of any type of fishing lure body or any other member that extends form a fishing lure body.

Various alternatives and embodiments are contemplated as being within the scope of the following claims particularly pointing out and distinctly claiming the subject matter regarded as the invention.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A fishing lure comprising:
a hook including an eye at a front end of said hook, a shank, a bend at a rear end of said hook, a first barb and a point;
a body being fixed at a front end of said shank and surrounding a front half of a length of said shank, said eye extending just forward of said body, said body including a head portion, a chin portion and a cylindrical neck, said neck surrounding a portion of said shank and including a rim, said rim being located at least one eighth inch rearward of said head portion and extending radially outward from said neck, said neck also including a second barb at a rear end thereof, said second barb being located at least one eighth inch rearward of said rim, said barb extending outward from said heck portion and being configured to fixedly hold an elastomeric neck portion of an artificial elastomeric night crawler which has been impaled on said second barb, said chin portion extending downward from said head portion and away from said shank, said chin portion then flaring out in a rearward direction to form a horizontal spoon-holding fan portion; and
a spoon portion being held by and extending rearward from said spoon-holding fan portion, said spoon having a bottom surface, a top surface, a teardrop shaped peripheral edge and a bowl, said spoon having a thickness of about one sixty-fourth inch and a width of about one third of a length of said spoon, said spoon being slightly cupped upward near the marginal edges thereof, said top surface of said spoon facing and being approximately parallel to said shank, said top surface of said spoon being spaced apart from said shank, and a free end of said spoon extending rearward beyond said bend of said hook.

2. The fishing lure defined in claim 1 wherein said body is molded from a material selected from the group consisting of lead, lead alloys and combinations thereof.

3. The fishing lure defined in claim 1 wherein said shank has a length of about two thirds of the length of said spoon.

4. The fishing lure defined in claim 1 wherein said shank has a length of between one third and two thirds of the length of said spoon.

5. The fishing lure defined in claim 1 further including an elastomeric feather attachment, said feather attachment including an first elastomeric neck portion having a throat formed therein, said first elastomeric neck portion being impaled over said rim, said first elastomeric neck portion fixedly embracing said rim.

6. The fishing lure defined in claim 1 further including an elastomeric artificial night crawler attachment, said artificial night crawler attachment including a second elastomeric neck portion having a throat formed therein, said elastomeric neck portion being impaled over said second barb, said second elastomeric neck portion fixedly embracing said second barb.

7. The fishing lure defined in claim 1 wherein said bowl of said spoon is about one sixty-fourth of an inch deep.

* * * * *